(12) United States Patent
Watanabe et al.

(10) Patent No.: US 8,344,071 B2
(45) Date of Patent: Jan. 1, 2013

(54) FLUORINE COATING COMPOSITION

(75) Inventors: Shinichiro Watanabe, Tokyo (JP); Isao Kimura, Ichihara (JP)

(73) Assignees: Asahi Kasei Chemicals Corporation, Tokyo (JP); Asahi Glass Company, Limited, Tokyo (JP)

( * ) Notice: Subject to any disclaimer, the term of this patent is extended or adjusted under 35 U.S.C. 154(b) by 437 days.

(21) Appl. No.: 12/311,798

(22) PCT Filed: Oct. 15, 2007

(86) PCT No.: PCT/JP2007/070084
§ 371 (c)(1),
(2), (4) Date: Apr. 14, 2009

(87) PCT Pub. No.: WO2008/047761
PCT Pub. Date: Apr. 24, 2008

(65) Prior Publication Data
US 2010/0179285 A1    Jul. 15, 2010

(30) Foreign Application Priority Data
Oct. 16, 2006   (JP) .................................. 2006-280914

(51) Int. Cl.
*C08F 214/18* (2006.01)

(52) U.S. Cl. .................. 525/326.3; 156/327; 156/331.7; 427/207.1; 525/123; 525/124; 525/326.2; 525/328.8; 528/44; 528/70

(58) Field of Classification Search ................ 427/207.1; 525/123, 124, 326.2, 326.3, 328.8; 528/44, 528/70
See application file for complete search history.

(56) References Cited

U.S. PATENT DOCUMENTS

| 4,436,773 | A | * | 3/1984 | Yamabe et al. | ............... | 427/380 |
| 2004/0247888 | A1 | * | 12/2004 | Watanabe et al. | ........... | 428/423.1 |

FOREIGN PATENT DOCUMENTS

| EP | 0 566 037 A2 | 10/1993 |
|---|---|---|
| EP | 2 083 056 A1 | 7/2009 |
| JP | 61-72013 | 4/1986 |
| JP | 63-199770 | 8/1988 |
| JP | 2-250872 | 10/1990 |
| JP | 4-306218 | 10/1992 |
| JP | 5-70444 | 3/1993 |
| JP | 5-222007 | 8/1993 |
| JP | 5-278240 | 10/1993 |
| JP | 6-41270 | 2/1994 |
| JP | 7-330860 | 12/1995 |
| JP | 2001-26626 | 1/2001 |
| JP | 2002-60459 | 2/2002 |
| JP | 2002-249535 | 9/2002 |
| JP | 2004-277716 | * 10/2004 |
| JP | 2005-048179 | * 2/2005 |
| JP | 2005-48179 | 2/2005 |
| JP | 2006-52265 | 2/2006 |
| JP | 2006-348235 | 12/2006 |
| JP | 2007-177171 | 7/2007 |
| JP | 2007-197642 | 8/2007 |
| WO | WO 03/027163 A1 | 4/2003 |
| WO | WO 2006/075636 A1 | 7/2006 |

OTHER PUBLICATIONS

International Search Report for International Application PCT/JP2007/070084 mailed Dec. 18, 2007.
European Search Report for EP 07 82 9818, mailed Oct. 20, 2011.

* cited by examiner

*Primary Examiner* — Robert C Boyle
(74) *Attorney, Agent, or Firm* — Staas & Halsey LLP

(57) ABSTRACT

Disclosed is a two-pack fluorine coating composition which comprises a combination of: a base component comprising a fluorinated copolymer having a hydroxyl group which can be dissolved in a low-polar weak solvent even at a low temperature and; a curing agent comprising a polyisocyanate compound. Specifically disclosed is a fluorine coating composition comprising: (A) a base component which comprises a fluorinated copolymer of a fluoroolefin and a monomer having a double bond copolymerizable with the fluoroolefin and which has a fluorine content of 10 mass % or more, wherein 5 to 30 mol % of the monomer has a hydroxyl group and 10 to 50 mol % of the monomer has a branched alkyl group having 3 or more carbon atoms; and (B) a curing agent comprising a polyisocyanate compound which is produced by the reaction between at least one diisocyanate selected from an aliphatic diisocyanate and a alicyclic diisocyanate and a monoalcohol having 1 to 20 carbon atoms and which has an [(allophanate group)/(isocyanurate group)] ratio of 90/10 to 81/19 by mole.

7 Claims, No Drawings

FLUORINE COATING COMPOSITION

CROSS REFERENCE TO RELATED PATENT APPLICATIONS

This application claims the benefit under 35 U.S.C. Section 371, of PCT International Application No. PCT/JP2007/070084, filed Oct. 15, 2007, which claimed priority to Japanese Application No. 2006-280914, filed Oct. 16, 2006 in the Japanese Patent Office, the disclosures of which are hereby incorporated by reference.

TECHNICAL FIELD

The present invention relates to a coating composition containing a base component comprising a fluorine-containing copolymer having a hydroxyl group soluble in a weak solvent and a curing agent comprising a polyisocyanate compound containing an allophanate group and an isocyanurate group in a specific ratio.

BACKGROUND ART

There has been conventionally known, as a coating material providing excellent weatherability, a fluorine coating composition comprising a base component containing a fluorine-containing copolymer having a hydroxyl group and a curing agent comprising a polyisocyanate compound. The fluorine coating composition is used as a heavy-duty top coat or as a top coat for a cement base material.

However, a conventional fluorine coating composition containing a so-called strong solvent such as toluene and xylene had a problem that if it is directly applied to a previously coated film of a paint blended with a synthetic resin, a chlorinated rubber paint, other lacquers and the like which are changed with time, shrinkage and swelling occur, thereby not obtaining a good adhesiveness.

In particular, a two-pack fluorine coating composition, which contains a base composition comprising a fluorine-containing copolymer having a hydroxyl group and a curing agent composition comprising a polyisocyanate, is widely used because it shows excellent performance in weatherability and contamination resistance, because a hydroxyl group of the base component and an isocyanate group of the curing agent cause a crosslinking reaction to constitute a three-dimensional network.

The fluorine-containing copolymer having a hydroxyl group used for the base component of the two-pack fluorine coating composition may produce a tough film wherein the film has a high crosslinking density and is excellent in weatherability and contamination resistance, as it has a higher content of the hydroxyl group (hydroxyl value). On the other hand, as it has a higher hydroxyl group content, it has a higher polarity and becomes difficult to dissolve in a weak solvent. For this reason, a strong solvent having a high dissolving power is usually used for the two-pack fluorine coating composition. As mentioned above, when the previously coated film is repaired, the two-pack fluorine coating composition has problems such as shrinkage, swelling, adhesiveness and the like.

In order to solve these problems, for the fluorine-containing copolymer having a hydroxyl group, there has been developed a fluorine-containing copolymer having a hydroxyl group, which can be dissolved in a weak soluble wherein the weak solvent has a dissolving power lower than a strong solvent. For example, in Patent Documents 1 and 2, there has been proposed a fluorine-containing copolymer having a hydroxyl group soluble in a mineral spirit which is a weak solvent. However, since the fluorine-containing copolymer having a hydroxyl group used in Patent Document 1 uses a two-pack fluorine coating material, deterioration in solubility in a weak solvent occurs when increasing the hydroxyl value.

On the other hand, as for the polyisocyanate compound used in the curing agent, there is used an aliphatic diisocyanate such as hexamethylene diisocyanate (hereinafter referred to as "HDI") or isophorone diisocyanate (hereinafter referred to as "IPDI"), or a prepolymer of an alicyclic diisocyanate. Since a conventional polyisocyanate compound also has a high polarity, it is required to be dissolved in a strong solvent in actual use. Therefore, in some cases, the conventional polyisocyanate had a problem that it requires countermeasures against odor and damages the primer coating film in case of repainting operations, repairing operations and recoating operations.

In order to solve the above problems, there has been developed a polyisocyanate compound which is excellent in solubility in a weak solvent. Patent Documents 3 to 7 have proposed a polyisocyanate compound obtained by urethanating or allophanating a long-chain diol or a monoalcohol, or a polyisocyanate compound obtained by allophanating and isocyanurating a long-chain diol or a monoalcohol at the same time. These polyisocyanate compounds often have an insufficient solubility in a weak solvent having a lower polarity at a low temperature.

Further, Patent Document 8 has proposed a fluorine coating composition containing a base component comprising a fluorine-containing copolymer having a hydroxyl group and a curing agent comprising a polyisocyanate compound having an allophanate group and an isocyanurate group obtained from a monoalcohol having 1 to 10 carbon atoms. However, the patent makes no reference to a weak solvent, and a fluorine-containing copolymer and a polyisocyanate compound having a hydroxyl group disclosed in the patent show no sufficient solubility in a weak solvent.

Patent Document 1: JP-A-63-199770
Patent Document 2: JP-A-2004-277716
Patent Document 3: JP-A-61-72013
Patent Document 4: JP-A-2-250872
Patent Document 5: JP-A-4-306218
Patent Document 6: JP-A-5-70444
Patent Document 7: JP-A-5-222007
Patent Document 8: JP-A-5-278240

DISCLOSURE OF THE INVENTION

Problems to be Solved by the Invention

It is the object of the present invention to provide a two-pack fluorine coating composition which comprises a combination of a base component containing a fluorine-containing copolymer having a hydroxyl group soluble in a weak solvent having a lower polarity even at a low temperature and a curing agent containing a polyisocyanate compound.

Means for Solving the Problems

As a result of extensive studies, the present inventors have found that the above problems may be solved by a fluorine coating composition comprising: a base component comprising a fluorine-containing copolymer having a hydroxyl group soluble in a weak solvent which contains a fluoroolefin and a double bond-containing monomer copolymerizable with the fluoroolefin in which the double bond-containing monomer contains a specific amount of a branched alkyl group having 3 or more carbon atoms and a specific amount of a hydroxyl group; and a curing agent composition comprising a polyisocyanate compound having an allophanate group and an isocyanurate group in a specific ratio, and have completed the present invention.

That is, the present invention provides:

(1) a fluorine coating composition comprising: (A) a base component comprising a copolymer of a fluoroolefin and a double bond-containing monomer copolymerizable with the fluoroolefin, wherein the copolymer has a fluorine content of 10% by mass or more based on the fluoroolefin, 5 to 30% by mol of the double bond-containing monomer has a hydroxyl group, and 10 to 50% by mol of the double bond-containing monomer has a branched alkyl group having 3 or more carbon atoms, and (B) a curing agent comprising a polyisocyanate compound, wherein the polyisocyanate compound is produced by the reaction of at least one diisocyanate selected from an aliphatic diisocyanate and an alicyclic diisocyanate and a monoalcohol having 1 to 20 carbon atoms and has a molar ratio of the allophanate group to the isocyanurate group in the range from 90:10 to 81:19;

(2) a fluorine-containing coating composition comprising: (A) a base component comprising a copolymer of a fluoroolefin and a double bond-containing monomer copolymerizable with the fluoroolefin, wherein the copolymer has a fluorine content of 10% by mass or more based on the fluoroolefin, 5 to 30% by mol of the double bond-containing monomer has a hydroxyl group, and 10 to 50% by mol of the double bond-containing monomer has a branched alkyl group having 3 or more carbon atoms, (B) a curing agent comprising a polyisocyanate compound, wherein the polyisocyanate compound is produced by the reaction of at least one diisocyanate selected from an aliphatic diisocyanate and an alicyclic diisocyanate and a monoalcohol having 1 to 20 carbon atoms and has a molar ratio of the allophanate group to the isocyanurate group in the range from 90:10 to 81:19, and a weak solvent; and (3) a fluorine coating composition described in the above (1) and (2), comprising: (A) a base component comprising a copolymer of a fluoroolefin and a double bond-containing monomer copolymerizable with the fluoroolefin, wherein the copolymer has a fluorine content of 10% by mass or more based on the fluoroolefin, 5 to 30% by mol of the double bond-containing monomer has a hydroxyl group, and 10 to 50% by mol of the double bond-containing monomer has a branched alkyl group having 3 or more carbon atoms; and (B) a curing agent comprising a polyisocyanate compound, wherein the polyisocyanate compound is produced by the reaction of at least one diisocyanate selected from an aliphatic diisocyanate and an alicyclic diisocyanate and a monoalcohol having 1 to 20 carbon atoms and has a molar ratio of the allophanate group to the isocyanurate group in the range from 90:10 to 81:19, wherein a mixing ratio between (A) and (B) is from 0.2 to 5.0 in terms of molar ratio of the isocyanate group to the hydroxyl group.

Advantages of the Invention

A base component comprising a fluorine-containing copolymer having a hydroxyl group and a curing agent comprising a polyisocyanate compound used in the present invention can be sufficiently stably dissolved in a weak solvent having a low polarity at a low temperature. Therefore, the fluorine coating composition of the present invention can be used even when dissolved in a weak solvent having a low polarity at a low temperature. In addition, the fluorine coating composition of the present invention may form a tough coated film, thereby enabling to form a coated film having a high hardness and a high adhesiveness.

BEST MODE FOR CARRYING OUT THE INVENTION

Hereinafter, the present invention will be explained in detail.

The fluorine coating composition of the present invention comprises (A) a base component comprising a fluorine-containing copolymer having a hydroxyl group and (B) a curing agent produced by the reaction of an aliphatic diisocyanate or an alicyclic diisocyanate with a monoalcohol having 1 to 20 carbon atoms.

Firstly, there will be described the base component according to a constituent feature (A) of the present invention.

The base component used in the present invention contains a fluorine-containing copolymer having a hydroxyl group. In the base component, there may be incorporated a coating resin such as a polymer comprising acrylic acid or its ester and a polyester in order to improve luster and hardness of the coated film and applicability of a coating material.

The fluorine-containing copolymer used in the present invention is a copolymer of a fluoroolefin and a double bond-containing monomer copolymerizable with the fluoroolefin, wherein the copolymer has a fluorine content of 10% by mass or more based on the total mass of the fluorine-containing copolymer, 5 to 30% by mol of the double bond-containing monomer based on the amount of the double bond-containing monomer contains a hydroxyl group, and 10 to 50% by mol of the double bond-containing monomer based on the amount of the double bond-containing monomer contains a branched alkyl group having 3 or more carbon atoms, and the copolymer is soluble in a weak solvent.

The fluoroolefin has a fluorine addition value of preferably 2 or more and more preferably 3 to 4. If the fluorine addition value is 2 or more, it preferably has a sufficient weatherability.

The fluoroolefin includes tetrafluoroethylene, chlorotrifluoroethylene, vinylidene fluoride and hexafluoropropylene, and especially preferred are tetrafluoroethylene and chlorotrifluoroethylene.

The double bond-containing monomer is copolymerizable with a fluoroolefin and there is preferably used a vinyl monomer other than a fluoroolefin. The vinyl monomer is a compound having a carbon-carbon double bond represented by $CH_2=CH-$.

The double bond monomer is preferably a monomer containing no fluorine atom.

The vinyl monomer includes an alkylvinyl ether and an alkylvinyl ester containing a linear, branched or cyclic alkyl group.

In the present invention, the double bond-containing monomer includes both a double bond-containing monomer containing a hydroxyl group (hereinafter referred to as a "hydroxyl group-containing monomer") and a double bond-containing monomer containing a branched alkyl group having 3 or more carbon atoms (hereinafter referred to as a "branched alkyl group-containing monomer"). In addition, the hydroxyl group-containing monomer may contain a branched alkyl group having 3 or more carbon atoms, and the branched alkyl group-containing monomer may contain a hydroxyl group.

Among the double bond-containing monomers in the present invention, 5 to 30% by mol of the copolymer contains a hydroxyl group.

If the content of the hydroxyl group-containing monomer is 5% by mol or more, it is preferable because a sufficient amount of hydroxyl group is introduced in the fluorine-containing copolymer in order to obtain a coated film having a high hardness.

In addition, if the content of the hydroxyl group-containing monomer is 30% by mol or less, it is preferable because a sufficient solubility in a weak solvent can be maintained as a coating material.

The carbon number of the hydroxyl group-containing monomer is not particularly limited, but is preferably from 2 to 10, more preferably from 2 to 6 and especially preferably from 2 to 4.

The hydroxyl group-containing monomer includes hydroxyalkyl vinyl ethers such as 4-hydroxybutyl vinyl ether (HBVE), 2-hydroxyethyl vinyl ether (HEVE) and cyclohexane dimethanol monovinyl ether; hydroxyalkyl allyl ethers such as hydroxyethyl allyl ether and cyclohexanedimethanol monoallyl ether; and (meth)acrylic acid hydroxyalkyl esters such as hydroxyethyl (meth)acrylate.

The hydroxyalkyl vinyl ethers are preferable because they are excellent in copolymerizability and the coated film formed is good in weatherability.

Above all, preferred is a hydroxyalkyl vinyl ether having 2 to 4 carbon atoms and more preferred is HBVE because they are excellent in solubility in a weak solvent.

It is not clear the reason why the solubility in a weak solvent is improved by using a hydroxyalkyl vinyl ether having 2 to 4 carbon atoms such as HBVE. However, it is presumed that the ether can not be easily influenced by a weak solvent, because the hydroxyl group of the side chain in a fluorine-containing copolymer is present near the main chain due to a small number of carbons and the other side chains cause steric hindrance thereby.

The hydroxyl group-containing monomer may be used alone or in combination with two or more kinds.

Among the double bond-containing monomers in the present invention, 10 to 50% by mol of the copolymer contains a branched alkyl group having 3 or more carbon atoms. Since the branched alkyl group-containing monomer is 10 to 50% by mol, the solubility in a weak solvent can be maintained even by using the above amount of the hydroxyl group-containing monomer.

It is not clear the reason why the solubility in a weak solvent can be maintained by using the branched alkyl group-containing monomer. However, it is presumed that the branched alkyl group-containing monomer has a similar molecular structure to a weak solvent and has a high compatibility with a weak solvent.

The carbon number of the branched alkyl group in the branched alkyl group-containing monomer is not particularly limited if it is 3 or more, but is preferably from 4 to 15 and is more preferably from 4 to 10. The branched alkyl group-containing monomer includes vinyl ethers containing a branched alkyl group, allyl ethers or (meth)acrylic acid esters. The branched alkyl group includes an isopropyl group, an isobutyl group, a sec-butyl group, a tert-butyl group, a 2-ethylhexyl group and a 2-methylhexyl group. As the branched alkyl group-containing monomer, preferred are vinyl ethers such as 2-ethylhexyl vinyl ether (2-EHVE) and tert-butyl vinyl ether (t-BuVE), because they are excellent in copolymerizability and more preferred is 2-EHVE. The branched alkyl group-containing monomer may be used alone or in combination with two or more kinds.

In the present invention, as the double bond-containing monomer, there may be further incorporated other double bond-containing monomers in addition to a hydroxyl group-containing monomer and a branched alkyl group-containing monomer, so long as the effect of the present invention is not impaired.

The other double bond-containing monomer preferably includes a monomer containing an alkyl group, and the alkyl group includes a linear, branched or cyclic alkyl group. The carbon number of the alkyl group is preferably from 2 to 8 and is more preferably from 2 to 6. Especially, a double bond-containing monomer containing a cyclic alkyl group is preferably used because the glass transition temperature (Tg) of a fluorine-containing copolymer is increased and the hardness of a coated film is further increased. The double bond-containing monomer containing the cyclic alkyl group includes cyclic alkyl vinyl ethers such as a cyclohexyl vinyl ether and cyclohexyl methyl vinyl ether and (meth)acrylic acid cyclic alkyl esters such as a cyclohexyl(meth)acrylate and 3,3,5-trimethylcyclohexyl(meth)acrylate. The other double bond-containing monomer may be used alone or in combination with two or more kinds.

The ratio of the other double bond-containing monomer in the total amount of the double bond-containing monomer is preferably from 0 to 70% by mol and more preferably from 30 to 60% by mol.

As for the ratio of a polymerization unit based on a fluoroolefin to a polymerization unit based on a double bond-containing monomer in a fluorine-containing copolymer, the polymerization unit based on a fluoroolefin is preferably from 30 to 70% by mol and more preferably from 40 to 60% by mol, and the polymerization unit based on a double bond-containing monomer is preferably from 70 to 30% by mol and more preferably from 60 to 40% by mol. If the polymerization unit based on a fluoroolefin is 70% by mol or less, the solubility of the fluorine-containing copolymer having a hydroxyl group in a weak solvent preferably becomes sufficient, and if the polymerization unit based on a fluoroolefin is 30% by mol or more, sufficient weatherability is preferably obtained.

The fluorine-containing copolymer used in the present invention can be produced by the copolymerization reaction of a mixture of a fluoroolefin and a double bond-containing monomer containing a hydroxyl group-containing monomer and a branched alkyl group-containing monomer in a predetermined ratio with use of a polymerization initiation source such as a polymerization initiator or an ionizing radiation in the presence or absence of a polymerization medium.

The ratio of use amount of a fluoroolefin to a double bond-containing monomer in the polymerization reaction is preferably the same ratio of the polymerization unit based on a fluoroolefin to the polymerization unit based on a double bond-containing monomer in the fluorine-containing copolymer.

The polymerization medium includes ketones such as methyl ethyl ketone and methyl isobutyl ketone; esters such as ethyl acetate and n-butyl acetate; aromatic solvents such as xylene and toluene; aliphatic solvents such as cyclohexane, solvent naphtha, mineral terpene, mineral spirit and petroleum naphtha; ethyl 3-ethoxypropionate, methyl amyl ketone, tert-butyl acetate, 4-chlorobenzotrifluoride, benzotrifluoride, monochlorotoluene, and 3,4-dichlorobenzotrifluoride.

The polymerization initiator includes azo initiators such as 2,2'-azobisisobutylonitrile, 2,2'-azobiscyclohexane carbonitrile, 2,2'-azobis(2,4-dimethylvaleronitrile) and 2,2'-azobis(2-methylbutylonitrile); and peroxide initiators such as ketone peroxides including cyclohexanone peroxide, hydroperoxides including tert-butylhydroperoxide, diacylperoxides including benzoyl peroxide, dialkylperoxides including di-tert-butylperoxide, peroxyketals including 2,2-di-(tert-butylperoxy)butane, alkyl peresters including tert-butylperoxypivarate and percarbonates including diisopropyl peroxy dicarbonate.

The fluorine-containing copolymer has a fluorine content based on the fluoroolefin of 10% by mass or more, preferably from 20 to 40% by mass and more preferably from 20 to 30% by mass, based on the total mass of the fluorine-containing copolymer. If the content of fluorine is 10% by mass or more, the weatherability of a coated film is preferably sufficient. In addition, if the content of fluorine is 40% by mass or less, there is an advantage that the solubility in a weak solvent is increased.

Further, the fluorine-containing copolymer contains a hydroxyl group as a reactive site with a curing agent. The hydroxyl value (hereinafter referred to as "OHV") in the fluorine-containing copolymer is preferably from 30 to 55 mgKOH/g and more preferably from 35 to 50 mgKOH/g in terms of the chemical reaction equivalent of potassium hydroxide, based on the total solids of the fluorine-containing copolymer. If the OHV is 30 mgKOH/g or more, a coated film having a high hardness can be obtained. If the OHV is 55 mgKOH/g or less, a fluorine-containing copolymer for a coating material preferably has a sufficient solubility in a weak solvent.

The fluorine-containing copolymer preferably has a number average molecular weight (Mn) of from 5000 to 10000 as measured by gel permeation chromatography (GPC) using a polystyrene standard. If the Mn is 5000 or more, the copolymer is preferably excellent in weatherability, and if the Mn is 10000 or less, the copolymer is preferably excellent in solubility in a weak solvent.

Hereinafter, the measuring method of GPC will be explained. All of the measurement values relating to the molecular weight of the fluorine-containing copolymer and the base component are obtained by the following measurement method; Instrument used: HLC-8020 (manufactured by Tosoh Co., Ltd.), Columns used: KF 806M, KF 806M, KF 802 (all of which are manufactured by Tosoh Co., Ltd.), Sample concentration: 5 wt/vol % (for example, 50 mg of a sample is dissolved in 1 ml of THF), Carrier: THF, Detection method: Differential refractometer, Flow rate: 1.0 ml/min., Column Temperature: 35° C.). The calibration curve was made by the standard samples of polystyrene having a molecular weight (Mp) of 7500000 to 580 (Easical PS-1, manufactured by Simasei Co., Ltd.).

In addition, the fluorine-containing copolymer has a glass transition point (hereinafter referred to as a "Tg") of 25° C. or higher and more preferably from 30 to 40° C. If the Tg is 25° C. or higher, a coated film with a higher hardness is preferably obtained.

The fluorine-containing copolymer for a coating material of the present invention preferably further contains a carboxy group. If the fluorine-containing copolymer contains a carboxy group, for example, the dispersibility of a pigment is increased when used as a coating material. The content of the carboxy group in the fluorine-containing copolymer is preferably from 0.5 to 5 mgKOH/g and more preferably from 2 to 5 mgKOH/g in terms of the chemical reaction equivalent of potassium hydroxide, based on the total solid contents of the fluorine-containing copolymer.

The carboxy group can be introduced, for example, by the polymerization reaction of the fluoroolefin and a double bond-containing monomer, followed by reacting a hydroxyl group in the fluorine-containing copolymer with a polyvalent carboxylic acid or its anhydride. In addition, the carboxy group can be introduced by the direct polymerization of a double bond-containing monomer having a carboxy group.

The fluorine-containing copolymer used in the present invention is soluble in a weak solvent. The term "soluble" as used in the present invention means that the fluorine-containing copolymer is stably present without separation and precipitation when dissolved in 100% by mass of a weak solvent under a condition of 23° C. In this case, the total amount of solids is preferably dissolved in a weak solvent. However, some insoluble solids may remain, and a so-called NAD (non-aqueous dispersion) may be formed.

The fluorine-containing copolymer used in the present invention and the base component may contain a weak solvent.

When the fluorine-containing copolymer or the base component contains a weak solvent, in the base component the mass ratio of the fluorine-containing copolymer which does not substantially contain any of weak solvent, fluoroolefin and monomer copolymerizable with the fluoroolefin to the weak solvent is preferably from 10:90 to 90:10. The lower limit of the mass ratio is preferably 20:80, more preferably 40:60 and most preferably 60:40. The upper limit of the mass ratio is preferably 90:10 and more preferably 85:15.

The weak solvent belongs to third-class organic solvents in the classification of organic solvents by Industrial Safety and Health Law (in Japan) and corresponds to any of the followings (1) to (3):

(1) gasoline, coal tar naphtha (including solvent naphtha), petroleum ether, petroleum naphtha, petroleum benzene, turpentine oil, mineral spirit (including mineral thinner, petroleum spirit, white spirit and mineral terpene), (2) a mixture consisting of (1), and (3) a mixture of (1) and a solvent other than (1), which contains 5% by mass or more of (1). However, the solvent has a ratio of a first-class organic solvent to a second-class organic solvent, which is 5% by mass or less.

In addition, the first-class organic solvent includes chloroform, carbon tetrachloride, 1,2-dichloroethane, 1,2-dichloroethylene, 1,1,2,2-tetrachlorethane, trichlorethane, carbon disulfide, a mixture consisting only of them and a mixture of them and solvents other than them, and contains more than 5% by mass of them.

Further, the second-class organic solvent includes acetone, isobutyl alcohol, isopropyl alcohol, isopentyl alcohol, ethyl alcohol, ethyleneglycol monoethylether, ethyleneglycol monoethylether acetate, ethyleneglycol mono-n-butylether, ethyleneglycol monomethylether, ortho-dichlorobenzene, xylene, cresol, chlorbenzene, isobutyl acetate, isopropyl acetate, isopentyl acetate, ethyl acetate, n-butyl acetate, n-propyl acetate, n-pentyl acetate, methyl acetate, cyclohexanol, cyclohexanone, 1,4-dioxane, dichloromethane, N,N-dimethylformamide, styrene, tetrachloroethylene, tetrahydrofuran, 1,1,1-trichlorethane, toluene, n-hexane, 1-butanol, 2-butanol, methanol, methyl isobutyl ketone, methyl ethyl ketone, methylcyclohexanol, methylcyclohexanone, methyl n-butyl ketone, a mixture consisting of these and a mixture of these and those other than these, and contains more than 5% by mass of these. (However, the solvent has a ratio of a first-class organic solvent of 5% by mass or less.)

As the weak solvent used in the present invention, more preferred is one which uses these third-class organic solvents and contains the second-class organic solvents corresponding to a strong solvent in an amount not exceeding 5% by mass of the total solvents. Further more preferred is a solvent having an aniline point of from 30 to 70° C. The lower limit of the aniline point is further preferably 40° C. and the upper limit of the aniline point is further preferably 60° C. If the aniline point exceeds 30° C., a previously coated film is not damaged, and if the aniline point is 70° C. or lower, a fluorine-containing copolymer and a polyisocyanate compound which are used in the present invention can be dissolved. In addition, the aniline point may be measured according to the aniline point test method described in JIS K 2256.

As the weak solvent, preferred is a mineral spirit because it has a flash point of room temperature or higher. A generally commercially available solvent as a mineral spirit includes HAWS (produced by Shell Japan Ltd., aniline point: 17° C.), Esso Naphtha No. 6 (produced by Exon Mobile Chemical Co., aniline point: 43° C.), LAWS (produced by Shell Japan Ltd., aniline point: 44° C.), Pegasol 3040 (produced by Exon Mobile Chemical Co., aniline point: 55° C.), A Solvent (produced by Nippon Oil corporation, aniline point: 45° C.), Cleansol (produced by Nippon Oil corporation, aniline point: 64° C.), Mineral Spirit A (produced by Nippon Oil corporation, aniline point: 43° C.), High Arom 2S ((produced by Nippon Oil corporation, aniline point: 44° C.), High Arom 2S (produced by Nippon Oil corporation, aniline point: 44° C.), Linearene 10 and Linearene 12 (Produced by Idemitsu Petrochemical Co., Ltd., α-olefinic hydrocarbon, aniline point: 44 and 54° C.), Exol D30 (produced by Exon Mobile Corporation, naphthenic solvent, aniline point: 63° C.), Rikasolve 900, 910B and 1000 (produced by New Japan Chemical Co., Ltd., hydrogenated C9 solvent, aniline point: 53° C., 40° C. and 55° C.). The weak solvent used in the present invention may be used alone or as a mixture of two or more kinds thereof.

Hereinafter, there will be described a curing agent comprising a polyisocyanate compound according to a constituent feature (B) of the present invention.

The curing agent used in the present invention contains a polyisocyanate compound.

The polyisocyanate compound used in the present invention is produced by the reaction of at least one diisocyanate selected from an aliphatic diisocyanate and an alicyclic diisocyanate with a monoalcohol having 1 to 20 carbon atoms, and has a molar ratio of the allophanate group to the isocyanurate group in the range from 90:10 to 81:19.

The aliphatic diisocyanate is a compound having an aliphatic group in the molecule. On the other hand, the alicyclic diisocyanate is a compound having a cyclic aliphatic group in the molecule. If the aliphatic diisocyanate is used, the resulting polyisocyanate compound preferably has a low viscosity. The aliphatic diisocyanate includes 1,4-diisocyanatobutane, 1,5-diisocyanatopentane, 1,6-diisocyanatohexane (hereinafter referred to as "HDI"), 1,6-diisocyanato-2,2,4-trimethylhexane and methyl 2,6-diisocyanatohexanoate (lysine diisocyanate). The alicyclic diisocyanate includes 5-isocyanato-1-isocyanatomethyl-1,3,3-trimethylcyclohexane (isophorone diisocyanate), 1,3-bis(isocyanatomethyl)cyclohexane (hydrogenated xylylene diisocyanate), bis(4-isocyanatocyclohexyl)methane (hydrogenated diphenylmethane diisocyanate) and 1,4-diisocyanatocyclohexane. Among these, preferred are HDI, isophorone diisocyanate, hydrogenated xylylene diisocyanate and hydrogenated diphenylmethane diisocyanate, because they are industrially readily available. Of these, most preferred is HDI, because it is extremely excellent in weatherability and the coated film is extremely excellent in flexibility. Hereinafter, the aliphatic diisocyanate and the alicyclic diisocyanate are collectively referred to as a diisocyanate.

In the present invention, there is used a monoalcohol having 1 to 20 carbon atoms. The lower limit of the carbon number of the monoalcohol is preferably 2, more preferably 3, further more preferably 4 and most preferably 6. The upper limit of carbon number of the monoalcohol is preferably 16, more preferably 12 and further more preferably 9. If the monoalcohol has a carbon number of one or more, it can exhibit a solubility in a weak solvent. If the monoalcohol has a carbon number of 20 or less, the hardness of the coated film is sufficient. The monoalcohol may be used alone or as a mixture of two or more kinds thereof. In addition, the monoalcohol used in the present invention may contain an ether group, an ester group or a carbonyl group in the molecule, but preferred is a monoalcohol consisting only of a saturated hydrocarbon group. Further, more preferred is a branched monoalcohol. Such a monoalcohol includes methanol, ethanol, 1-propanol, 2-propanol, 1-butanol, 2-butanol, isobutanol, 1-pentanol, 2-pentanol, isoamyl alcohol, 1-hexanol, 2-hexanol, 1-heptanol, 1-octanol, 2-ethyl-1-hexanol, 3,3,5-trimethyl-1-hexanol, tridecanol, pentadecanol, palmityl alcohol, stearyl alcohol, cyclopentanol, cyclohexanol, methylcyclohexanol and trimethylcyclohexanol. Among these, more preferred are isobutanol, n-butanol, isoamyl alcohol, 1-hexanol, 1-heptanol, 1-octanol, 2-ethyl-1-hexanol, tridecanol, pentadecanol, palmityl alcohol, stearyl alcohol and 1,3,5-trimethylcyclohexanol because they are especially excellent in solubility in a weak solvent. Further more preferred are 1-propanol, isobutanol, 1-butanol, isoamyl alcohol, pentanol, 1-hexanol, 2-hexanol, 1-heptanol, 1-octanol, 2-octanol, 2-ethyl-hexylalcohol and 3,3,5-trimethyl-1-hexanol because the viscosity is further decreased. Most preferred are isobutanol, 2-hexanol, 2-octanol, 2-ethyl-1-hexanol and 3,3,5-trimethyl-1-hexanol because they are extremely excellent in solubility in a weak solvent.

The polyisocyanate compound used in the present invention has a molar ratio of the allophanate group to the isocyanurate group in the range from 90:10 to 81:19. The upper limit of the molar ratio of the allophanate group to the isocyanurate group is more preferably 88:12 and further more preferably 86:14. The lower limit of the molar ratio of the allophanate group to the isocyanurate group is more preferably 83:17. If the molar ratio of the allophanate group to the isocyanurate group is in the range from 90:10 to 81:19, the hardness and solubility in a weak solvent become sufficient.

In addition, the molar ratio of the allophanate group to the isocyanurate group can be determined by $^1$H-NMR. Below is shown an example of methods for measuring a polyisocyanate compound using a hexamethylene diisocyanate and an isocyanate prepolymer resulting from the hexamethylene diisocyanate as raw materials by $^1$H-NMR.

Example of measuring method by $^1$H-NMR: The polyisocyanate compound is dissolved in deuterated chloroform at a concentration of 10% by mass (addition of 0.03% by mass of tetramethylsilane based on the polyisocyanate compound). As the chemical shift standard, the signal of the hydrogen of tetramethylsilane was taken as 0 ppm. Through measurement by means of $^1$H-NMR, a determination is made for a ratio of the signal area of the hydrogen atom bonded to the nitrogen of the allophanate group in the vicinity of 8.5 ppm (1 mole of hydrogen atom to 1 mole of allophanate group) to the signal area of the hydrogen atom of the methylene group adjacent to the isocyanurate group in the vicinity of 3.85 ppm (6 moles of hydrogen atom to 1 mole of isocyanurate group).

Allophanate groups/Isocyanurate groups=(Signal area in the vicinity of 8.5 ppm)/(Signal area in the vicinity of 3.85 ppm/6)

In addition, since an urethodione product has a low solubility in a weak solvent and is readily dissociated by heat or the like to produce HDI, it is preferable to reduce the content of the urethodione product. The content of the urethodione product is preferably 10% by mass or less, more preferably 5% by mass or less and further more preferably 3% by mass or less, based on the polyisocyanate compound. The content of the urethodione product may be determined by measuring the ratio of the peak area of a molecular weight of approximately 336 as measured by gel permeation chromatography (hereinafter referred to as "GPC") using a differential refractometer. If there is a peak which is an obstacle to the measurement in the vicinity of the peak of a molecular weight of approximately 336, the content of the urethodione product may be determined by a method of quantitatively measuring a ratio of the peak height of the urethodione group in the vicinity of 1770 cm$^{-1}$ to the peak height of the allophanate group in the vicinity of 1720 cm$^{-1}$ using the internal standard by use of FT-IR.

Hereinafter, the measuring method by GPC is described. All the measurement values relating to the molecular weight of the polyisocyanate compound and the curing agent were obtained by the following measuring method; Instrument used: HLC-8120 (manufactured by Tosoh Co., Ltd.), Columns used: TSK GEL SuperH1000, TSK GEL SuperH2000, and TSK GEL SuperH3000 (all of which are manufactured by Tosoh Co., Ltd.), Sample concentration: 5 wt/vol %, Carrier: THF, Detection method: Differential refractometer, Flow rate: 0.6 ml/min., Column Temperature: 30° C.). The calibration curve was made by the standard samples of polystyrene having a molecular weight of 50000 to 2050 (PSS-06 (Mw=50000), BK13007 (Mp=20000, Mw/Mn=1.03), PSS-08 (Mw=9000), PSS-09 (Mw=4000) and 5040-35125 (Mp=2050, Mw/Mn=1.05), manufactured by GL Sciences Inc.) and the trimer to heptamer of isocyanurate products (molecular weight of isocyanurate trimer=504, molecular weight of isocyanurate pentamer=840, molecular weight of isocyanurate heptamer=1176) and HDI (molecular weight=168) of hexamethylene diisocyanate polyisocyanate compounds (DURANATE TPA-100, manufactured by Asahi Kasei Chemicals Corporation).

In addition, since a biuret product and the other diisocyanate polymers have also a reduced solubility in a weak solvent, a high content thereof is not preferable. The range of the amounts of the biuret product and the other diisocyanate polymers contained in the polyisocyanate compound used in the present invention is preferably 10% by mass or less, more preferably 5% by mass or less and further more preferably 3% by mass or less.

An urethane product increases the adhesiveness with a base material, but a too high content thereof may result in the decrease in solubility in a weak solvent. The range of the amount of the urethane product contained in the polyisocyanate compound used in the present invention is preferably from 0.1 to 10% by mass, more preferably from 0.2 to 5% by mass and further more preferably from 0.5 to 3% by mass.

The isocyanate group content (hereinafter referred to as "NCO content") of the polyisocyanate compound used in the present invention is from 10 to 22% by mass, preferably from 13 to 21% by mass and more preferably from 16 to 20% by mass, in a state where no solvent or diisocyanate is substantially incorporated. If the NCO content is in the range of 10 to 22% by mass, there may be obtained a polyisocyanate compound which is fully dissolved in a weak solvent and has a good crosslinking property.

The polyisocyanate compound used in the present invention preferably has a viscosity of from 50 to 500 mPa·s in a state where no solvent or diisocyanate is substantially incorporated. The lower limit of the viscosity is preferably 75 mPa·s, more preferably 100 mPa·s and further more preferably 120 mPa·s. The upper limit of the viscosity is preferably 450 mPa·s, more preferably 400 mPa·s, further more preferably 350 mPa·s and most preferably 300 mPa·s. If the viscosity is 50 mPa·s or more, there may be obtained a polyisocyanate compound having a good crosslinking property. If the viscosity is 500 mPa·s or less, there can be obtained a coating composition in which the VOC components are reduced.

The polyisocyanate compound used in the present invention preferably has a number average functional group number (isocyanate group) of from 2.10 to 2.50. The lower limit of the number average functional group number is more preferably 2.15 and further more preferably 2.20. The upper limit of the number average functional group number is more preferably 2.40 and further more preferably 2.35. If the number average functional group number is in the range of 2.10 to 2.50, the hardness when a coated film is formed and the solubility in a weak solvent becomes satisfactory.

The number average functional group number can be determined by the following equation.

The number average functional group number=The number average molecular weight×The NCO content(%)/4200

The number average molecular weight can be determined by the GPC measurement.

The polyisocyanate compound used in the present invention is soluble in a weak solvent.

The polyisocyanate compound and the curing agent used in the present invention may contain a weak solvent.

When the polyisocyanate compound or the curing agent contains a weak solvent, in the curing agent the mass ratio of the polyisocyanate compound which does not substantially contain any of weak solvents and diisocyanate to the weak solvent is preferably from 5:95 to 95:5. The lower limit of the mass ratio of the polyisocyanate to the weak solvent is more preferably 10:90 and further more preferably 15:85. The upper limit of mass ratio of the polyisocyanate to the weak solvent is more preferably 90:10 and further more preferably 80:20.

Hereinafter, there will be described a method for producing the polyisocyanate compound used in the present invention.

As the method for producing the polyisocyanate compound used in the present invention, there may be mentioned the following three methods.

(1) A method of obtaining a polyisocyanate compound by subjecting a monoalcohol having 1 to 20 carbon atoms and a diisocyanate to an urethanation reaction, and subsequently or simultaneously followed by carrying out the allophanation and isocyanuration reactions.

(2) A method of obtaining a polyisocyanate compound by mixing a polyisocyanate containing an allophanate group with a polyisocyanate having an isocyanurate group, wherein the polyisocyanate containing the allophanate group is obtained by subjecting a monoalcohol having 1 to 20 carbon atoms and a diisocyanate to an urethanation reaction and subsequently or simultaneously followed by carrying out the allophanation reaction and the polyisocyanate having the isocyanurate group is obtained by subjecting a diisocyanate to isocyanuration reaction.

(3) A method of obtaining a polyisocyanate compound by mixing a polyisocyanate containing an allophanate group with a polyisocyanate having an allophanate group and an isocyanurate group, wherein the polyisocyanate containing the allophanate group is obtained by subjecting a monoalcohol having 1 to 20 carbon atoms and a diisocyanate to an urethanation reaction and subsequently or simultaneously followed by carrying out the allophanation reaction and the polyisocyanate having the allophanate group and the isocyanurate group is obtained by subjecting a monoalcohol having 1 to 20 carbon atoms and a diisocyanate to an urethanation reaction and subsequently or simultaneously followed by carrying out the allophanation and isocyanuration reactions.

The method of (1) is characterized by having an excellent production efficiency because the polyisocyanate compound may be produced by one process. The methods of (2) and (3) are characterized in that the physical properties of the resulting polyisocyanate compound are easily adjusted because it is possible to mix a polyisocyanate having an isocyanurate structure or a polyisocyanate having an isocyanurate structure and an allophanate structure with a polyisocyanate having an allophanate structure at an optional ratio.

Any of the above methods may be used if the polyisocyanate compound is produced by adjusting the molar ratio of the allophanate group to the isocyanurate group in the range of 90:10 to 81:19.

The urethanation reaction is carried out preferably at 20 to 200° C., more preferably at 40 to 150° C. and further more preferably at 60 to 120° C., preferably for 10 min. to 24 hours, more preferably for 15 min. to 15 hours and further more preferably for 20 min. to 10 hours. If the reaction is carried out at 20° C. or higher, the reaction proceeds rapidly. If the reaction is carried out at 200° C. or lower, side reactions such as the urethodionation are suppressed and coloration is also suppressed. If the reaction time is 10 minutes or longer, the reaction may be completed, and if the reaction time is 24 hours or shorter, side reactions are also suppressed without any problems with production efficiency. The urethanation reaction may be carried out in the absence of a catalyst or in the presence of a catalyst such as a tin catalyst and an amine catalyst.

The allophanation reaction is carried out preferably at 20 to 200° C., more preferably at 40 to 180° C., further more preferably at 60 to 160° C., still further more preferably at 90 to 150° C. and most preferably at 110 to 150° C. If the reaction is carried out at 20° C. or higher, the amount of the allophanation catalyst is reduced and the time required for the completion of the reaction is shorter. In addition, if the reaction is, carried out at 200° C. or lower, side reactions such as the urethodionation are suppressed and the coloration of the reaction product is also suppressed.

The reaction time of the allophanation reaction is preferable for 10 min. to 24 hours, more preferably for 15 min. to 12 hours, further more preferably for 20 min. to 8 hours and still further more preferably for 20 min. to 6 hours. If the reaction time is 10 minutes or longer, the reaction can be controlled, and if the reaction time is within 24 hours, the reaction efficiency is sufficient. In addition, if the reaction temperature exceeds 130° C., urethodione may be generated as a side-reaction. Therefore, the reaction time is preferably within 8 hours, more preferably within 6 hours and further more preferably within 4 hours.

The isocyanuration reaction, or the allophanation and isocyanuration reactions are carried out preferably at 20 to 180° C., more preferably at 30 to 160° C., further more preferably at 40 to 140° C., still further more preferably at 60 to 130° C. and most preferably at 80 to 110° C. If the reaction temperature is 20° C. or higher, side-reactions such as the nylonization reaction are unlikely to occur as the amount of the allophanation catalyst becomes smaller. In addition, if the reaction is carried out at 180° C. or lower, side reactions such as the urethodionation are suppressed and the coloration of the reaction product is also suppressed.

The isocyanuration reaction, or the allophanation and isocyanuration reactions are carried out preferably for 10 min. to 24 hours, more preferably for 15 min. to 12 hours, further more preferably for 20 min. to 8 hours and still further more preferably for 20 min. to 6 hours. If the reaction time is 10 minutes or longer, the reaction may be controlled, and if the reaction time is within 24 hours, the production efficiency is sufficient.

If the method of the above (1) is used, a catalyst is more preferably used for the allophanation and isocyanuration reactions, and it is especially preferable to select a catalyst so that the molar ratio of the allophanate group to the isocyanurate group of the polyisocyanate generated is from 81:19 to 90:10. Such a catalyst includes a carboxylate salt of zinc, a carboxylate salt of bismuth, an alkoxide of zinc, tin, zirconium, zirconyl and the like.

If a polyisocyanate having an allophanate group is produced by using the method of the above (2) or (3), a catalyst is more preferably used for the allophanation reaction, and it is preferable to select a catalyst having a high selection ratio for the allophanate group and more preferable to select a catalyst so that the molar ratio of the allophanate group to the isocyanurate group of the polyisocyanate generated is from 90:10 to 100:0. Such a catalyst includes a calboxylate salt of zinc, tin, zirconyl and zirconium or a mixture thereof.

If a polyisocyanate having an isocyanurate group is produced by using the method of the above (2), a catalyst is more preferably used for the isocyanuration reaction. The isocyanuration catalyst includes a carboxylate salt of tetraalkyl ammonium, hydroxyalkyl ammonium and an alkali metal; a hydroxide; an aminosilyl group-containing compound or a mixture thereof.

If a polyisocyanate having an allophanate group and an isocyanurate group is produced by using the method of the above (3), a catalyst is more preferably used for the allophanation and isocyanuration reactions. The allophanation and isocyanuration catalyst includes a carboxylate salt of tetraalkyl ammonium, hydroxyalkyl ammonium and an alkali metal, a hydroxide, an aminosilyl group-containing compound or a mixture thereof. In particular, in the case where a catalyst having a moderately-high selection ratio for the allophanation is used, the urethane group is not likely to remain, and this is preferable. Therefore, more preferred is a catalyst so that the molar ratio of the allophanate group to the isocyanurate group of the polyisocyanate generated is from 40:60 to 70:30. Such a catalyst includes a carboxylate salt of tetraalkyl ammonium and hydroxyalkyl ammonium or a mixture thereof.

The use amounts of the allophanation catalyst, the isocyanuration catalyst and the allophanation and isocyanuration catalyst are preferably from 0.001 to 2.0% by mass and more preferably from 0.01 to 0.5% by mass, based on the total mass of the reaction solution. The catalysts may exhibit a sufficient effect when used in an amount of 0.001% by mass or more. The catalysts may easily control the allophanation reaction when used in an amount of 2% by mass or less.

In the present invention, the addition method of the allophanation catalyst, the isocyanuration catalyst and the allophanation and isocyanuration catalyst is not limited. For example, they may be added before producing a compound having an urethane group, that is, prior to the urethanation reaction of an organic compound having a diisocyanate group and a hydroxyl group. They may be added during the urethanation reaction of an organic compound having a diisocyanate group and a hydroxyl group, or may be added after producing an urethane group-containing compound. In addition, as the addition method, a required amount of the allophanation catalyst may be collectively added or may be added separately in several times. Also, the addition method may be continuously added at a constant speed.

The urethanation reaction and the allophanation reaction, the isocyanuration reaction, and the allophanation and isocyanuration reactions proceed in the absence of a solvent. However, in addition to the above weak solvents, there can be used an ester solvent such as ethyl acetate and butyl acetate; a ketone solvent such as methyl ethyl ketone; an aromatic solvent such as toluene, xylene and diethylbenzene; an organic solvent having no reactivity with an isocyanate group such as dialkyl polyalkylene glycol ether; and a mixture thereof, if necessary.

The processes of the urethanation reaction, the allophanation reaction, the isocyanuration reaction, and the allophanation and isocyanuration reactions in the present invention can be tracked by measuring the NCO content or the refractive index of the reaction solution.

The allophanation reaction, the isocyanuration reaction, the allophanation and isocyanuration reactions can be stopped by cooling the reaction solution to room temperature or by adding a reaction terminator. However, if a catalyst is used, the reaction terminator is more preferably added because side-reactions can be suppressed. The amount of the reaction terminator added is preferably from 0.25- to 20-fold molar amounts, more preferably from 0.5- to 16-fold molar amounts and further more preferably from 1.0- to 12-fold molar amounts, relative to the catalyst. The catalyst can be completely deactivated by adding the reaction terminator in an amount of 0.25-fold molar amounts or more of the catalyst. The preservation stability may be improved by adding the reaction terminator in an amount of 20-fold molar amounts or less of the catalyst. Any reaction terminators may be used if they deactivate the catalyst. The examples of the reaction terminators include compounds of phosphoric acid such as phosphoric acid and pyrophosphoric acid, which shows acidity; a monoalkyl or dialkyl ester of phosphoric acid, pyrophosphoric acid and the like; a halogenoacetic acid such as monochloroacetic acid, benzoyl chloride, a sulphonate ester, sulfuric acid, a sulfate ester, an ion exchange resin and a chelating agents. From the industrial viewpoint, preferred are phosphoric acid, pyrophosphoric acid, metaphosphoric acid, polyphosphoric acid and a phosphoric acid monoalkyl ester or a phosphoric acid dialkyl ester because they hardly corrode stainless steel. The phosphoric acid monoester and phosphoric acid diester include phosphoric acid monoethyl ester, phosphoric acid diethyl ester, phosphoric acid monobutyl ester, phosphoric acid dibutyl ester, phosphoric acid mono(2-ethylhexyl)ester, phosphoric acid di(2-ethylhexyl) ester, phosphoric acid monodecyl ester, phosphoric acid didecyl ester, phosphoric acid monolauryl ester, phosphoric acid dilauryl ester, phosphoric acid mono-tridecyl ester, phosphoric acid di-tridecyl ester, phosphoric acid monooleyl ester, phosphoric acid dioleyl ester or a mixture thereof.

In addition, there may be used an adsorbent such as silica gel or activated carbon as a terminator. In this case, the addition amount of 0.05 to 10% by mass is preferred based on the diisocyanate used in the reaction.

After completion of the reaction, the unreacted diisocyanate or solvent may be separated from the polyisocyanate reaction. For safety purposes, the unreacted diisocyanate is preferably separated. A method of separating the unreacted diisocyanate and the solvent includes a thin film distillation method or a solvent extraction method.

Hereinafter, there will be described a fluorine coating composition of the present invention and a material which may be added in the fluorine coating composition, the base component and the curing agent used in the present invention.

In the fluorine coating composition of the present invention, the content of the fluorine-containing copolymer used in the present invention is preferably 20% by mass or more, more preferably 30% by mass or more and most preferably 40% by mass or more, based on the total solid contained in the fluorine coating composition.

The fluorine coating composition of the present invention is most preferable in that the total amount of the solid content contained is dissolved in a weak solvent but may contain some insoluble portions.

The addition amount of the weak solvent in the fluorine coating composition is determined arbitrarily considering the solubility of the fluorine-containing copolymer, the proper viscosity when coated as a coating material, the application method and the like.

Since the fluorine-containing copolymer used in the present invention is excellent in solubility in a weak solvent, the amount of the weak solvent contained in the fluorine coating composition may be adjusted in the range of 10 to 30% by mass.

The mass ratio of the base component and the curing agent to the weak solvent in the fluorine coating composition containing the weak solvent is preferably from 10:90 to 90:10. The lower limit of the mass ratio is more preferably 15:85, and the upper limit of the mass ratio is more preferably 85:15.

The ratio of mixing the base component (A) comprising the fluorine-containing copolymer having a hydroxyl group with the curing agent (B) comprising a polyisocyanate compound is preferably in the range of 0.2 to 5.0 in the molar ratio of the isocyanate group to the hydroxyl group. The lower limit of the molar ratio is more preferably 0.3, further more preferably 0.4 and most preferably 0.5. The upper limit of the molar ratio is more preferably 4.0, further more preferably 3.0 and most preferably 2.0. If the molar ratio is in the range of 0.2 to 5.0, a tough coated film may be formed.

The fluorine coating composition of the present invention may contain a weak solvent.

In the fluorine coating composition of the present invention, and the base component and the curing agent which are used in the present invention, there may be incorporated various additives used in the technical field such as coloring pigments, dyes, silane coupling agents for improving adhesiveness of a coated film, ultraviolet absorbers, curing promoters, light stabilizers, frosting agents, coated film surface hydrophylizing agents, catalysts, drying property improvers, levelling agents, antioxidants, plasticizers, and surface active agents, so long as the effect of the present invention is not impaired, depending on the objects and the applications.

The coloring pigments and dyes include carbon black having good weatherability, inorganic pigments such as titanium oxide, organic pigments such as phthalocyanine blue, phthalocyanine green, quinacridone red, indanthrene orange, isoindolinone yellow, and dyes.

The silane coupling agents include 3-aminopropyltriethoxysilane, 3-aminopropyltrimethoxysilane, N-2-(aminoethyl)-3-aminopropyltrimethoxysilane, ureidepropyltriethoxysilane, vinyltriethoxysilane, vinyltrimethoxysilane, 3-methacryloxypropyltrimethoxysilane, 3-methacryloxypropyltriethoxysilane, 2-(3,4-epoxycyclohexyl)ethyltrimethoxysilane, 3-glycidoxypropyltrimethoxysilane, 3-mercaptopropyltrimethoxysilane, 3-isocyanatepropyltriethoxysilane, methyltriethoxysilane and methyltrimethoxysilane.

The ultraviolet absorbers include benzophenone, benzotriazole, triazine and cyanoacrylate ultraviolet absorbers.

The light stabilizers include a hindered amine light stabilizer, and there may be mentioned Adeka Stab LA62 and Adeka Stab LA67 (all of which are produced by Adeka-Argus Chemical Co., Ltd., trade name), Tinuvin 292, Tinuvin 144, Tinuvin 123 and Tinuvin 440 (all of which are produced by Ciba Speciality Chemicals Co., trade name).

The frosting agents include ultrafine powder synthetic silica. If a frosting agent is used, an elegant, semilustrous and frost-finished coated film can be formed.

The coated film surface hydrophylizing agents preferably is a silicate compound. If the silicate compound is incorporated, the coated film surface becomes hydrophilic and the resistance to rain-streaky stain is exhibited on the coated film. Since the silicate compound reacts with a hydroxyl group, it is preferably added to the curing agent (B) when the silicate compound is premixed. Also, the silicate compound may be simultaneously mixed when the base component and the curing agent are mixed.

The silicate compound is at least one compound selected from a tetraalkoxysilane, a condensate of a tetraalkoxysilane, and a derivative of a tetraalkoxysilane or condensate thereof.

When the condensate of a tetraalkoxysilane is used, the average condensation degree is 1 to 100. If the average condensation degree is in the range of 1 to 100, when a coated film is formed, the hydrophilicity of the coated film surface becomes sufficiently high. In addition, the condensate of a tetraalkoxysilane can be produced by a well-known method.

The silicate compound includes tetramethoxysilane, tetraethoxysilane, tetra-n-propoxysilane, tetraisopropoxysilane, tetra-n-butoxysilane, tetraisobutoxysilane, tetra-tert-butoxysilane, dimethoxydiethoxysilane, tetraphenoxysilane and a condensate thereof. Among these, preferred are a condensate of tetramethoxysilane and a condensate of tetraethoxysilane because the coated film surface tends to be hydrophilic when a coated film is formed.

Further, as the silicate compound, there may be used a tetraalkoxysilane in which two or more kinds of alkoxyl groups having different numbers of carbon atoms are present together or a condensate thereof. This is a method of using tetramethoxysilane or a compound obtained by substituting 5 to 50% by mol of the methoxy group or ethoxy group of tetraethoxysilane with an alkoxyl group having 3 to 10 carbon atoms. The ratio of substituting the methoxy group or the ethoxy group with an alkoxyl group having 3 to 10 carbon atoms is more preferably from 8 to 40% by mol and further more preferably from 12 to 35% by mol. As the substituting alkoxyl group, preferred are a butyl group, a pentyl group, a hexyl group and an octyl group, and more preferred are an n-butyl group, an isobutyl group, a tert-butyl group, an n-hexyl group, an n-octyl group and a 2-ethyl-1-hexyl group. These silicate compounds and especially condensates thereof are greatly preferable. This is because when a coated film is formed, the coated film surface has a high hydrophilicity and has a high solubility in a weak solvent. In addition, the condensates of these silicate compounds are most preferably used because the hydrophilicity of the coated film surface becomes higher.

The tetraalkoxysilane or the derivative of the condensate thereof is referred as a silicate compound in which a part of the alkoxy group is substituted with, for example, a polyalkylene glycol monoalkyl ester or a polyalkylene glycol monoaryl ester.

Examples of the catalyst for promoting curing include a dialkyl tin dicarboxylate compound such as dibutyl tin dilaurate, dioctyl tin laurate and dibutyl tin diacetate; a tin oxide compound such as dibutyl tin oxide; a metal carboxylate such as tin 2-ethylhexanoate, zinc 2-ethylhexanoate and a cobalt salt; and tertiary amines such as triethylamine, pyridine, methylpyridine, benzyldimethylamine, N,N-dimethylcyclohexylamine, N-methylpiperidine, pentamethyldiethylenetriamine, N,N'-endoethylene-piperadine and N,N'-dimethylpiperadine.

The drying property improvers include CAB (cellulose acetate butyrate) and NC (nitrocellulose).

The fluorine coating composition of the present invention is a two-pack coating material which is used by mixing (A) a base component comprising a fluorine-containing copolymer having a hydroxyl group and (B) a curing agent comprising a polyisocyanate compound in a coating field. However, a weak solvent may be added if necessary. Also, additives may be further added, if necessary.

The mixing order is not particularly limited, and for example, there are the following methods:

A method of using mixing a base component with a curing agent at a coating field, wherein the base component premixes a weak solvent and an additive;

A method of using mixing a base component and a curing agent in a coating field and followed by further mixing a weak solvent with an additive; and A method of using mixing a base component with a curing agent at a coating field, wherein the base component premixes a weak solvent and an additive and the curing agent premixes an additive and a weak solvent.

As a method for coating a fluorine coating material of the present invention, there may be employed an optional methods such as spray coating, air spray coating, brush coating, immersion coating, roll coater and flow coater.

An article material to be coated includes an inorganic material such as concrete, natural stone and glass; a metal such as iron, stainless steel, aluminum, copper, brass and titanium; and an organic material such as plastics, rubbers, adhesives and woods.

In particular, the fluorine coating composition is suitable for coating on a coated film which is already formed, that is, a surface of a previously coated film.

In addition, the fluorine coating composition is suitable for coating an organic-inorganic composite material such as a fiber-reinforced plastics (FRP), a resin-reinforced concrete and a fiber-reinforced concrete.

In addition, an article to be coated includes a transportation device such as an automobile, a train and an airplane; a construction component such as a bridge component and a steel tower, industrial equipment such as a waterproof material sheet, a tank and a pipe; a building component such as an external coating for a building, a door, a window component, a monument and a pole; a road component such as a center divider, a guardrail and a soundproof wall; a communication equipment; and an electric or electronic component.

A base component comprising a fluorine-containing copolymer having a hydroxyl group and a curing agent comprising a polyisocyanate compound used in the present invention can be sufficiently stably dissolved in a weak solvent having a low polarity at a low temperature. Therefore, the fluorine coating composition of the present invention can be used even when dissolved in a weak solvent having a low polarity at a low temperature. In addition, the fluorine coating composition of the present invention may form a tough coated film, thereby enabling to form a coated film having a high hardness and a high adhesiveness.

EXAMPLES

The present invention will be described based on examples.

By using $^1$H-NMR (FT-NMR DPX-400 manufactured by Bruker Inc.), the ratio of the allophanate group to the isocyanurate group was determined by a ratio of the signal area of the hydrogen atom on the nitrogen atom of the allophanate group in the vicinity of 8.5 ppm to the signal area of the hydrogen atom of the methylene group adjacent to the nitrogen atom of the isocyanurate ring of the isocyanurate group in the vicinity of 3.8 ppm.

The NCO content rate was determined by neutralizing the isocyanate group with an excess of 2N amine, followed by back titrating with 1N hydrochloric acid.

The viscosity was measured by using an E type viscometer (manufactured by Tokimec Inc.) at 25° C.

A standard rotor (1°34'×R24) was used. The number of revolutions was as follows.

100 r.p.m. (in the case of less than 128 mPa·s)
50 r.p.m. (in the case of 128 mPa·s to 256 mPa·s)
20 r.p.m. (in the case of 256 mPa·s to 640 mPa·s)
10 r.p.m. (in the case of 640 mPa·s to 1280 mPa·s)
5 r.p.m. (in the case of 1280 mPa·s to 2560 mPa·s)

The solubility in a weak solvent was evaluated by observing a state where 50 parts by mass, 100 parts by mass, 200 parts by mass and 500 parts by mass of a weak solvent were added relative to 100 parts by mass of the polyisocyanate compound, followed by allowing to stand for 24 hours. In addition, the solubility in a weak solvent is represented by the following equation.

The solubility in a weak solvent(%)=((The mass of the solvent added(g)×100%)/(The mass of the polyisocyanate compound(g))

The gel fraction was determined by the mass of a coated film obtained by immersing approximately 0.1 g of a coated film in acetone at 23° C. for 24 hours, followed by taking out the coated film to dry at 80° C. for one hour.

Synthesis Example 1

Synthesis of Polyisocyanate Compound

The inside atmosphere in a four neck flask equipped with a stirrer, a thermometer and a cooling tube was replaced with nitrogen and then was charged with 1000 g of HDI and 100 g of 2-ethylhexanol, followed by subjecting the resulting mixture to urethanation reaction at 90° C. under stirring for one hour. At 90° C., to the resulting reaction mixture was added 10 g of a mineral spirit solution having a solid content of 20% of bismuth 2-ethylhexanoate (produced by Nihon Kagaku Sangyo Co., Ltd., and prepared by diluting "Nikkaoctics Bismuth 25%" (trade name) with a mineral spirit) as an allophanation and isocyanuration catalyst. When the refractive index of the reaction solution was increased to 0.01, 4.5 g (8.0-fold mole relative to the catalyst) of phosphoric acid 2-ethylhexyl ester (produced by Johoku Chemical Co., Ltd., trade name: JP-508) was added to terminate the reaction.

After filtering the reaction solution, unreacted HDI was removed at 160° C. (27 Pa) at the first time and at 50° C. (13 Pa) at the second time by using a falling thin film distillation apparatus.

The resulting polyisocyanate compound was a clear liquid. The yield was 420 g, the viscosity was 160 mPa·s and the NCO content rate was 17.4%. The result of the measurement by NMR showed that the molar ratio of the allophanate to the isocyanurate was 84:16. The resulting polyisocyanate compound is referred to as P-1.

Synthesis Example 2

Polyisocyanate Having Allophanate Group and Isocyanurate Group

An apparatus similar to Synthesis Example 1 was charged with 1000 g of HDI and 100 g of 2-ethylhexanol, followed by subjecting the resulting mixture to urethanation reaction at 90° C. under stirring for one hour. To the resulting reaction mixture was added 0.36 g of an n-butanol solution having a solid content of 10% of tetramethylammonium caprate as an allophanation and isocyanuration catalyst. When the NCO content rate of the refractive index of the reaction solution was 35.8%, 0.58 g (4.0-fold mole relative to the catalyst) of an aqueous solution having a solid content of 85% of phosphoric acid was added to terminate the reaction.

After filtering the reaction solution, unreacted HDI was removed in the same manner as in Synthesis Example 1.

The resulting polyisocyanate compound was a clear liquid. The yield was 480 g, the viscosity was 450 mPa·s and the NCO content rate was 17.7%. The result of the measurement by NMR showed that the molar ratio of the allophanate to the isocyanurate was 65:35. The resulting polyisocyanate compound is referred to as P-2.

Synthesis Example 3

Synthesis of Polyisocyanate Having Allophanate Group

An apparatus similar to Synthesis Example 1 was charged with 2700 g of HDI and 210 g of 2-ethylhexanol, followed by subjecting the resulting mixture to urethanation reaction at 130° C. under stirring for one hour. To the resulting reaction mixture was added 0.54 g of a mineral spirit solution having a solid content of 20% of zirconyl 2-ethylhexanoate as an allophanation catalyst. When the refractive index of the reaction solution was increased to 0.0055, 0.81 g (4.0-fold mole relative to the catalyst) of a 50% isobutanol solution of phosphoric acid dodecyl ester (produced by Johoku Chemical Co., Ltd., and prepared by diluting "JP-512" (trade name) with isobutanol) was added to terminate the reaction.

After filtering the reaction solution, unreacted HDI was removed in the same manner as in Synthesis Example 1.

The resulting polyisocyanate compound was a clear liquid. The yield was 770 g, the viscosity was 110 mPa·s and the NCO content rate was 17.2%. The result of the measurement by NMR showed that the molar ratio of the allophanate group to the isocyanurate group was 97:3. The resulting polyisocyanate compound is referred to as P-3.

Synthesis Example 4

Polyisocyanate Having Allophanate Group Using Diol

An apparatus similar to Synthesis Example 1 was charged with 800 g of HDI and 50.6 g of 12-hydroxystearyl alcohol (trade name: Sobamole 912, produced by Cognis Japan Ltd., Hydroxyl value: 345 to 365 mgKOH/g), followed by subjecting the resulting mixture to urethanation reaction at 130° C. under stirring for one hour. To the resulting reaction mixture was added 0.51 g of a mineral spirit solution having a solid content of 20% of zirconyl 2-ethylhexanoate as an allophanation catalyst. After 30 minutes, when the refractive index of the reaction solution was increased to 0.0035, 0.070 g (1.05-fold mole relative to the catalyst) of a butanol solution having a solid content of 50% of pyrophosphoric acid was added to terminate the reaction.

Subsequently, unreacted HDI was removed in the same manner as in Synthesis Example 1.

The resulting polyisocyanate compound was a clear liquid. The yield was 170 g, the viscosity was 750 mPa·s and the NCO content rate was 16.6%. The result of the measurement by NMR showed that the molar ratio of the allophanate to the isocyanurate was 97:3. The resulting polyisocyanate compound is referred to as P-4.

The solubility of P-4 in a weak solvent was tested. The solubility of P-4 in HAWS was good at the ratio of 50% to 50% at 0° C. The solubility of P-4 in A solvent was good at the ratio of 50% and 100% at 0° C.

Synthesis Example 5

P-2 obtained in Synthesis Example 2 and P-3 obtained in Synthesis Example 3 were mixed at a mass ratio of 40:60 to obtain a polyisocyanate compound P-5.

P-5 was a clear liquid. The NCO content rate was 17.6% and the viscosity was 180 mPa·s. The result of the measurement by NMR showed that the molar ratio of the allophanate to the isocyanurate was 83:17.

Examples 1 to 2 and Comparative Examples 1 to 3

A base component containing enamel pigments was prepared by the following method using a fluorine-containing copolymer used in the present invention (trade name: Lumiflon LF800, produced by Asahi Glass Co., Ltd., a copolymer of a fluoroolefin and a double bond-containing monomer copolymerizable with the fluoroolefin, a monomer having a hydroxyl group=9% by mol, a monomer containing a branched alkyl group having 3 or more carbon atoms=15% by mol, hydroxyl value=38 mgKOH/g (solid content), heating residue=60%, solvent composition=mineral spirit (trade name: Mineral Spirit A, produced by Nippon Oil Corporation, aniline point=43° C.).

| Preparation of Mill Base Composition: | |
|---|---|
| Lumiflon LF800 (fluorine content: 22.7% by mass) | 25.05 g |
| D-918 (trade name, Sakai Chemical Industry Co., Ltd., titanium oxide) | 60.00 g |
| A Solvent | 64.95 g |
| Glass Bead | 150.00 g |

The above composition was placed in 0.5 L container, followed by stirring by a paint shaker for 2 hours to prepare a mill base.

| Letdown Composition: | |
|---|---|
| Mill Base | 57.00 g |
| Lumiflon LF800 | 78.00 g |
| A Solvent | 14.70 g |
| 0.1% BTL (mineral spirit solution) | 0.30 g |

The above composition was placed in 0.2 L container and then was letdown in a paint shaker for 20 minutes to prepare a base component containing enamel pigments.

The base component was mixed with each of P-1 (Example 1), P-5 (Example 2), P-2 (Comparative Example 1), P-3 (Comparative Example 2) and P-4 (Comparative Example 3) in a ratio of NCO to OH=1.0 to obtain a fluorine coating composition. The fluorine coating composition was applied on a chromate-treated aluminum plate having dimensions of 75 mm×150 mm by a spray coating technique so that the dried film thickness is 25 μm, followed by drying under the conditions of a temperature of 23° C. and a relative humidity of 50% for one week.

Measurements were made for the pencil hardness (destruction), the water resistant second adhesion test and the solubility of a curing agent in a weak solvent of the coated film.

Pencil Hardness:

The test was performed based on JIS K 5600-5-4, Scratch Hardness (Pencil method).

Water Resistant Second Adhesion Test 1:

The coated plate was precut into 25 pieces at a distance of 2 mm and then was immersed in boiling water for two hours. Thereafter, the test was performed based on JIS K 5600-5-6, Adhesion Test (Cross-cut Method). The evaluation was also conducted according to JIS K 5600-5-6 and was classified into 6 grades from 0 point to 6 points.

Water Resistant Second Adhesion Test 2:

The coated plate was immersed in boiling water for two hours and pulled out and thereafter was cut into 25 pieces at a distance of 2 mm. Subsequently, the test was performed based on JIS K 5600-5-6, Adhesion Test (Cross-cut Method). The evaluation was also conducted according to JIS K 5600-5-6 and was classified into 6 grades from 0 point to 6 points.

Solubility of a Curing Agent in a Weak Solvent (0° C.)

Under the condition of 0° C., after adding 50 parts by mass, 100 parts by mass, 200 parts by mass and 500 parts by mass of a weak solvent based on 100 parts by mass of the polyisocyanate compound, the state of each mixture, after allowing to stand for 24 hours, was observed. In addition, the solubility in a weak solvent is represented by the following equation.

The solubility in a weak solvent(%)=((The mass of a solvent added(g)×100%)/(The mass of the polyisocyanate compound(g))

As the weak solvent, there was A solvent (trade name, a mineral spirit produced by Nippon Oil Corporation, aniline point=45° C.) for the test. The test results are shown in Table 1. As shown in Table 1, in Examples 1 and 2, the weak solvent is completely compatible with the polyisocyanate compound in any of the cases where 50 parts by mass, 100 parts by mass, 200 parts by mass and 500 parts by mass of a weak solvent are added based on 100 parts by mass of the polyisocyanate compound. On the other hand, in Comparative Examples 1 and 3, when 50 parts by mass of the weak solvent is added, it is completely compatible with the polyisocyanate compound. However, when 100 parts by mass, 200 parts by mass and 500 parts by mass of a weak solvent are added, the weak solvent is not compatible with the polyisocyanate compound.

TABLE 1

| | Polyisocyanate | Pencil hardness | Water Resistant Second Adhesion Test 1 | Water Resistant Second Adhesion Test 2 | Solubility of a Curing Agent in a Weak Solvent |
|---|---|---|---|---|---|
| Example 1 | P-1 | H | 1 | 1 | 50-500% |
| Example 2 | P-5 | H | 1 | 1 | 50-500% |
| Comparative Example 1 | P-2 | H | 1 | 1 | 50% |

TABLE 1-continued

|  | Polyisocyanate | Pencil hardness | Water Resistant Second Adhesion Test 1 | Water Resistant Second Adhesion Test 2 | Solubility of a Curing Agent in a Weak Solvent |
|---|---|---|---|---|---|
| Comparative Example 2 | P-3 | B | 3 | 2 | 50-500% |
| Comparative Example 3 | P-4 | H | 2 | 2 | 50% |

INDUSTRIAL APPLICABILITY

An article material to be coated with the fluorine coating composition of the present invention includes an inorganic material such as concrete, natural stone and glass; a metal such as iron, stainless steel, aluminum, copper, brass and titanium; and an organic material such as plastics, rubbers, adhesives and woods.

In particular, the fluorine coating composition is suitable for coating on a coated film which is already formed, that is, a surface of a previously coated film.

In addition, the fluorine coating composition is suitable for coating an organic-inorganic composite material such as a fiber-reinforced plastics (FRP), a resin-reinforced concrete and a fiber-reinforced concrete.

In addition, an article to be coated includes a transportation device such as an automobile, a train and an airplane; a construction component such as a bridge component and a steel tower, industrial equipment such as a waterproof material sheet, a tank and a pipe; a building component such as an external coating for a building, a door, a window component, a monument and a pole; a road component such as a center divider, a guardrail and a soundproof wall; a communication equipment; and an electric or electronic component.

The invention claimed is:

1. A fluorine coating composition comprising:
   (A) a base component comprising a copolymer of a fluoroolefin and at least two double bond-containing monomers copolymerizable with the fluoroolefin, wherein the copolymer has a fluorine content of 10% by mass or more based on the fluoroolefin, and
   the at least two double bond-containing monomers comprise 5 to 30% by mol of a monomer containing a hydroxyl group and 10 to 50% by mol of a monomer containing a branched alkyl group having 3 or more carbon atoms; and
   (B) a curing agent comprising a polyisocyanate compound having a number average functional group number of from 2.10 to 2.50, produced by the reaction of a non-cyclic aliphatic diisocyanate with a monoalcohol having 1 to 20 carbon atoms and has a molar ratio of an allophanate group to an isocyanurate group in the range from 90:10 to 81:19.

2. The fluorine coating composition according to claim 1, further comprising a weak solvent.

3. The fluorine coating composition according to claim 1, wherein a mixing ratio between (A) and (B) is from 0.2 to 5.0 in terms of a molar ratio of the isocyanate group to the hydroxyl group.

4. The fluorine coating composition according to claim 2, wherein a mixing ratio between (A) and (B) is from 0.2 to 5.0 in terms of a molar ratio of the isocyanate group to the hydroxyl group.

5. The composition of claim 1, wherein the monoalcohol has 1 to 9 carbon atoms.

6. The composition of claim 3, wherein the monoalcohol has 1 to 9 carbon atoms.

7. The composition of claim 4, wherein the monoalcohol has 1 to 9 carbon atoms.

* * * * *